Oct. 26, 1965  L. A. JOHNSON  3,213,490
EJECTOR FOR MOLDED PIECES
Filed July 26, 1962  2 Sheets-Sheet 2
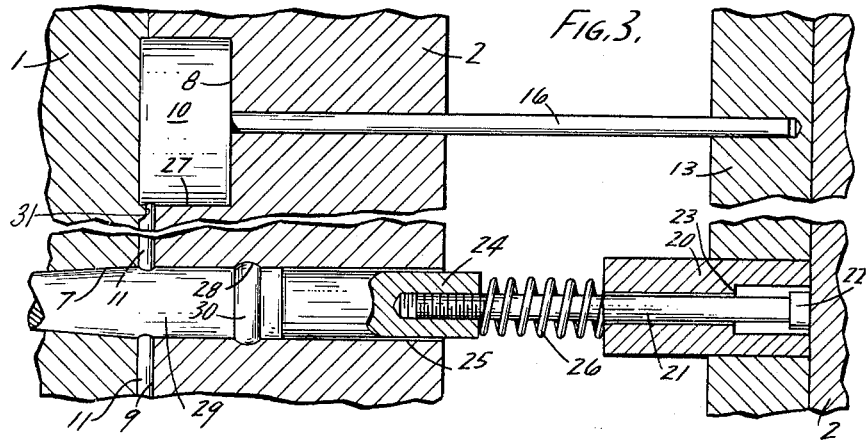
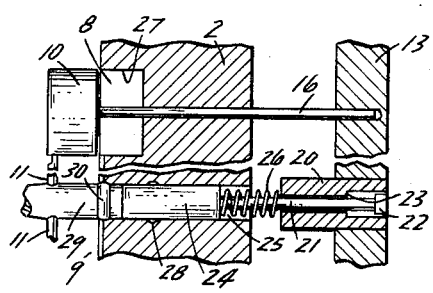
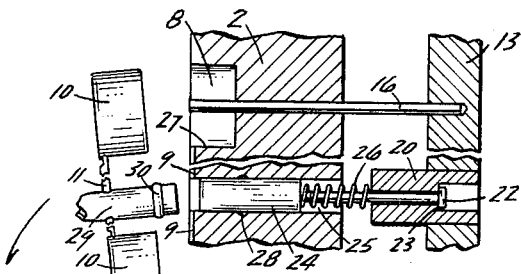
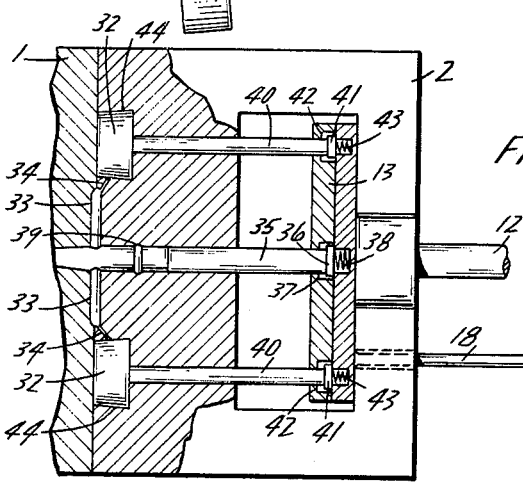
INVENTOR.
LAWRENCE A. JOHNSON
BY
ANDRUS & STARKE
ATTORNEYS.

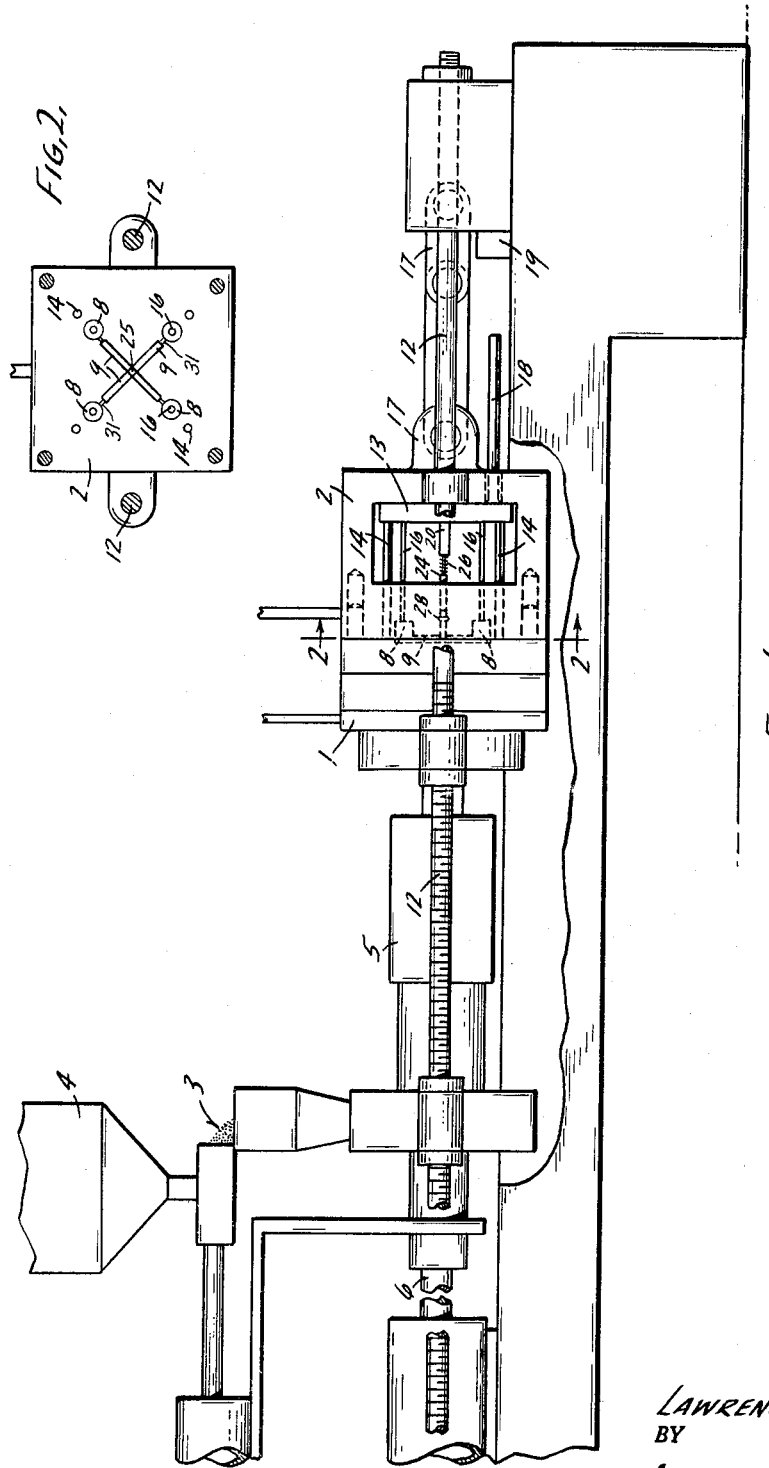

United States Patent Office 3,213,490
Patented Oct. 26, 1965

3,213,490
EJECTOR FOR MOLDED PIECES
Lawrence A. Johnson, Milwaukee, Wis., assignor of one-half to George Johnson, Mequon, Wis.
Filed July 26, 1962, Ser. No. 212,582
7 Claims. (Cl. 18—2)

This invention relates to an ejector for molded pieces, and more particularly to an ejector for parts molded in a die.

Heretofore, in machines for molding plastic and like parts, fixed and movable die members have been provided. These members close for the molding operation and are then opened for ejection of the molded piece. The ejection is usually accomplished by knockout pins which separate the piece from the mold cavity.

Problems have arisen in some instances, as where a plurality of molded pieces are connected by a sprue, runners and gates in the mold. It has been found that while the pieces may separate from the mold cavity, they will often adhere to the ends of the knockout pins. This necesarily causes a slowdown in the molding operation until separation is accomplished by manual or other means.

The present invention overcomes the above problem and is based on the discovery that the molded pieces can be surely and quickly separated from the ejector mechanism by utilizing inertia and sudden acceleration forces.

In accordance with the invention, means are provided to temporarily increase the resistance of the molded piece to complete removal from the cavity by the knockout pins. In addition, means are provided to subsequently release the said resistance and provide a sudden acceleration of the piece away from the cavity, together with a sudden shock-like force which positively separates the piece from the ejector mechanism.

The accompanying drawings illustrate the best mode contemplated by the inventor for carrying out the invention.

In the drawings:

FIGURE 1 is a schematic side elevation of a molding machine incorporating the concept of the invention and with parts broken away;

FIGURE 2 is a side elevation of the face of the movable die, taken on line 2—2 of FIGURE 1;

FIGURE 3 is an enlarged fragmentary longitudinal section through the dies and showing the molded piece prior to ejection;

FIGURE 4 is a view similar to FIGURE 3 and showing the position of the elements just as the molded piece emerges from the cavity;

FIGURE 5 is a view similar to FIGURE 3 and showing the final separation step; and FIGURE 6 is a view similar to FIGURE 3 and showing a slightly different embodiment of the invention.

As shown in the drawings, the invention may be utilized in a molding machine of conventional type having a fixed die portion 1, a movable die portion 2 and means 3 to feed plastic material to the die cavity.

The plastic feed means 3 is shown as comprising a hopper 4 which feeds plastic pellets to a heater 5 and ram 6, the latter forcing the softened plastic through a tube and sprue 7 in die portion 1 to the interface between die portions 1 and 2.

As shown, each die portion cavity comprises a plurality of mold cavities 8 connected by runners 9, the latter all being connected to the inner end of sprue 7. When the die portions are closed and ram 6 operated, plastic flows into cavities 8 through runners 9 and hardens into a single multi-part member radiating outwardly from the center. This member comprises four molded pieces 10 joined by runners 11.

Once the plastic is hardened sufficiently, it is desired to remove the pieces from the mold. For this purpose, die portion 2 is mounted for longitudinal movement on a plurality of tie rods 12. In addition, a knockout plate 13 is mounted on return pins 14 within die portion 2 and is adapted for movement therewith and also relative thereto, as will be described.

Plate 13 supports one end of each of a plurality of knockout pins 16 which extend through die portion 2 and into communication with each cavity 8. When the die portions are closed, the outer ends of pins 16 are adjacent but not within the cavities.

The rightward end of die portion 2 is connected through a moving mechanism 17 to a suitable power source, not shown, to provide the motive means for moving die portion 2 and the molded member rightwardly away from die portion 1. As this occurs, knockout plate 13 will travel with die portion 2 until a stop rod 18 on the plate engages a fixed stop 19. Subsequently, die portion 2 will continue moving away from die portion 1, but plate 13 and pins 16 will remain stationary.

As die portion 2 moves further back, pins 16 will be caused to enter cavities 8 and will eject pieces 10 therefrom. However, the pieces may resist dropping off the ends of the pins.

To prevent this, the sprue puller pin which would normally be disposed centrally of the die, i.e., at the hub of runners 9, is replaced by the ejecting mechanism of the invention.

For this purpose, and in the embodiment of FIGURES 1–5, plate 13 is provided with a central opening within which is fixedly mounted a tubular housing 20 having a bolt 21 extending therethrough. (See FIGURE 3.) The inner end of bolt 21 is provided with an enlarged head 22 which is adapted to engage a housing shoulder 23 to limit bolt movement toward the die faces, as will be described. The outer end of bolt 21 is threadably received within a flat faced ejector pin 24 which is mounted within a longitudinal passage 25 communicating with the hub of runners 9. Bolt 21 and pin 24 are biased toward the die interface by a resilient spring 26 mounted on bolt 21 and extending between the facing ends of housing 20 and pin 24.

When the die portions are closed and prior to entry of plastic into the mold, spring 26 will urge pin 24 toward the interface until head 22 engages shoulder 23. However, as plastic under pressure enters the mold and also enters passage 25, it will compress and force pin 24 back to the limit of its travel. The amount of retraction of ejector pin 24 must be at least the depth of the rim 27 of the die cavity portion 8 in die portion 2.

In assuring positive separation of the molded member from the ejector mechanism, a combination of sequentially operating opposing forces are utilized.

The first force is retractive and tends to hold the molded member in contact with rim 27 of die portion 2. In accordance with the embodiment shown in FIGURES 1–5 of the drawings, this retractive force is provided by a frictional resistance created in the cavity by a small circumferential groove 28 in passage 25 spaced from the end thereof a distance at least equal to the depth of rim 27. During molding, a plastic sprue member 29 fills passage 25 up to pin 24 and forms an enlarged ring 30 in groove 28.

As knockout pins 16 force the molded pieces 10 away from the face of die portion 2, the spring pressed ejector pin assembly will also move sprue member 29 in the same direction. Ring 30 will pull out of groove 28 and move down passage 25, but there will be severe frictional resistance to such initial outward movement. Spring 26 is not strong enough to appreciably overcome the frictional retractive force.

The amount of retractive force bears a direct relationship with the size of groove 28 and the frictional and flowable characteristics of the plastic used.

Other means than groove 28 may be utilized to provide the necessary initial frictional resistance without departing from the spirit of the invention.

The frictional resistance will continue until pieces 10 have completely separated from rim 27, since ring 30 was initially disposed at least as deep into the die body as the rim.

After separation of the molded pieces 10 from rim 27 (see FIGURE 4), ring 30 will next be released from passage 25, thus permitting spring 26 to quickly accelerate movement of pin 24 and the molded member in a direction opposite from that of the retractive force. Members 10 will thus be released from pins 16, but sprue member 29 will still adhere to ejector pin 24.

Positive separation of member 29 from the relatively flat face of pin 24 is assured by a sudden stop of the accelerative travel of pin 24. This is provided by engagement of head 22 with stop shoulder 23, and creates a snap action whereby the inertia of the moving molded piece separates member 29 from pin 24 (see FIGURE 5).

The embodiment of FIGURES 1–5 utilize runner gates 31 which are at the interface of the dies. Thus the entire molded part, including pieces 10 and runners 11, is ejected in a single piece.

Where submarine gating is used, the molded pieces and runner assembly may separate upon die separation, necessitating an additional utilization of the resistance-acceleration-sudden stop principle.

In the embodiment of FIGURE 6, a plurality of molded pieces 32 are again formed, together with a plurality of runners 33. However, the runner gates 34 are submerged beneath the face of die portion 1. Upon separation of die portions 1 and 2, pieces 32 will break from the connected runners.

In this embodiment the central ejector comprises a one-piece ejector pin 35 having an enlarged head 36 adapted to move in a recess in knockout plate 13 and engage a shoulder 37 therein. The biasing spring 38 is mounted behind head 36 in the recess. A groove 39 in the die passage for pin 35, or an equivalent friction producing means, is also utilized.

In addition to being used in the central ejector mechanism, the invention is additionally utilized by replacing knockout pins 16 with pins 40 which have enlarged heads 41 adapted to engage a shoulder 42 in plate 13 and which are biased toward the die interface by springs 43 behind the heads. The frictional resistance means may comprise a number of structures, such as a negative draft of the die cavity 44, as shown, or a groove, or any other equivalent.

Upon separation of the die portions and breaking of the pieces from the runner assembly, central ejector pin 35 will operate in accordance with the invention to positively eject the said assembly, and ejector pins 40 will operate in accordance with the invention to positively eject pieces 32.

The invention provides a novel means for preventing molded parts from sticking to ejector mechanism in a die mold. The elements are simple and inexpensive to manufacture and provide a substantial improvement in operation of a molding device.

Various modes of carrying out the invention are contemplated as being within the scope of the following claims and particularly pointing out and distinctly claiming the subject matter which is regarded as the invention.

I claim:

1. A device for positively removing a molded member from a die cavity comprising:
   (a) ejector means for engaging said member and moving the member in a first direction away from the die cavity,
   (b) means disposed within said cavity to provide resistance to movement of said member by said ejector means during initial movement of said member away from said cavity and acting in a second direction opposite from said first direction,
   (c) resilient means to suddenly accelerate said ejector means in said first direction upon release of said means (b),
   (d) and means to suddenly stop movement of said ejector means while it is accelerating.

2. For use with a die having a face provided with a mold cavity, a device for positively removing a molded member from the cavity, comprising:
   (a) a passage in said die which communicates with said cavity,
   (b) an ejector pin movably disposed in said passage and adapted to engage a molded member which is in said cavity,
   (c) means to move the molded member in a direction outwardly from the die cavity,
   (d) disposed with said cavity means for providing frictional resistance to movement of the said molded member during the initial movement of said member outwardly of said cavity,
   (e) resilient means to suddenly accelerate said ejector pin and thereby said molded member in said outwardly direction upon release of said means (d),
   (f) and stop means to suddenly prevent further outward movement of the accelerating ejector pin.

3. The device of claim 2 in which the means (d) comprises:
   (a) a circumferential groove disposed in said passage inwardly from the cavity a distance at least equal to the depth of the cavity rim.

4. The device of claim 2 in which the resilient means comprises:
   (a) a spring biasing said ejector pin toward the die cavity,
   (b) said spring being insufficiently strong to appreciably overcome the frictional resistance of said means (d).

5. For use with a die providing a mold cavity and a sprue cavity for formation of a molded assembly having a plurality of molded pieces joined by interconnecting runners having a sprue thereon, apparatus comprising:
   (a) knockout means for engaging said molded pieces and moving them in a direction outwardly from the said mold cavity,
   (b) ejector means having a substantially flat face for engaging said sprue and moving it in said outwardly direction in said sprue cavity,
   (c) means disposed within said sprue cavity to provide frictional resistance to movement of said sprue by said ejector means during initial outward movement of said sprue and acting in an opposite direction from said outwardly direction,
   (d) resilient means to suddenly accelerate said ejector means in said outwardly direction upon release of said means (c),
   (e) and means to suddenly stop movement of said ejector means so that said sprue is inertially released from the flat face of the latter by a shock-like action.

6. The apparatus of claim 5 in which:
   (a) said ejector means comprises:
      (1) a knockout plate disposed at the rear of said die and movable relative thereto,
      (2) and a bolt slideably mounted in said die for communication with said sprue;
   (b) and said resilient means comprises:
      (1) a spring connected to said bolt for biasing the latter into engagement with said sprue;
   (c) and said sudden stop means (e) comprises:
      (1) a shoulder associated with said knockout plate,
      (2) and an enlarged head on said bolt and disposed to suddenly move into engagement with said shoulder during accelerating movement of the bolt to provide a shock-like force on said bolt.

7. The apparatus of claim 5 in which the knockout means comprises:
(a) a knockout plate disposed at the rear of said die and movable relative thereto,
(b) a plurality of pins slideably mounted in said die and with each pin disposed to engage a molded piece and move it in a direction outwardly from the die cavity,
(c) means disposed in said mold cavity to provide resistance to the initial movement of each said molded piece in said outwardly direction,
(d) resilient means to suddenly accelerate each said pin in said outwardly direction upon release of the piece from the mold cavity,
(e) and means to suddenly stop movement of each said pin so that each piece is inertially released from its respective pin by a snap action.

References Cited by the Examiner
UNITED STATES PATENTS

| | | | |
|---|---|---|---|
| 2,217,661 | 10/40 | Anderson | 18—42 |
| 2,330,369 | 9/43 | Marsh | 18—42 |
| 2,363,808 | 11/44 | Sayre | 18—2 |
| 2,994,921 | 8/61 | Hultgren | 18—2 |

WILLIAM J. STEPHENSON, *Primary Examiner.*
MICHAEL V. BRINDISI, *Examiner.*

UNITED STATES PATENT OFFICE
CERTIFICATE OF CORRECTION

Patent No. 3,213,490                       October 26, 1965

Lawrence A. Johnson

It is hereby certified that error appears in the above numbered patent requiring correction and that the said Letters Patent should read as corrected below.

Column 4, line 20, for "disposed with said cavity means" read -- means disposed with said cavity --; line 61, after "shock-like" insert -- snap --.

Signed and sealed this 19th day of July 1966.

(SEAL)
Attest:

ERNEST W. SWIDER                      EDWARD J. BRENNER
Attesting Officer                       Commissioner of Patents